United States Patent [19]

Robinson et al.

[11] 4,134,141

[45] Jan. 9, 1979

[54] RECORDING AND REPRODUCING MEANS

[75] Inventors: Stephen P. Robinson, Camberley; David C. Evans, Woodley; Martin Hewitt, Church Crookham, all of England

[73] Assignee: Ansafone Limited, Surrey, England

[21] Appl. No.: 797,112

[22] Filed: May 16, 1977

[30] Foreign Application Priority Data

Jul. 26, 1974 [GB] United Kingdom ............... 33228/76

[51] Int. Cl.[2] .................... G11B 15/16; G11B 19/26; G11B 27/22

[52] U.S. Cl. ........................ 360/90; 179/100.1 DR; 360/62; 360/72; 360/74

[58] Field of Search .................. 360/90, 62, 83–84, 360/71–74, 61; 179/100.1 DR

[56] References Cited

U.S. PATENT DOCUMENTS

| | | | |
|---|---|---|---|
| 3,347,996 | 10/1967 | Ouhikoshi | 360/90 |
| 3,711,657 | 1/1973 | Niioka et al. | 360/71 |
| 3,752,935 | 8/1973 | Iwawaki | 360/62 |
| 3,930,266 | 12/1975 | Okamoto | 360/62 |
| 3,935,389 | 1/1976 | Waldman | 179/6 E |
| 3,943,291 | 3/1976 | Okamura et al. | 179/6 E |
| 3,959,817 | 5/1976 | Honjo et al. | 360/62 |
| 4,032,712 | 6/1977 | Catto et al. | 360/71 |
| 4,041,249 | 8/1977 | Matz et al. | 360/74 |

*Primary Examiner*—Alfred H. Eddleman
*Attorney, Agent, or Firm*—Browdy and Neimark

[57] ABSTRACT

A recording and reproducing machine in which electrical signals are recorded on a recording medium while the medium is driven forwardly along a predetermined path. Recording and reproducing means are switched between record and reproducing modes. Detecting means are associated with means for switching electrical connections in the machine between record and reproducing modes. The detecting means assume a predetermined condition when the end of the last recorded signal on the recording medium is adjacent to the recording and reproducing means. The driving means can then be operated to drive the medium forwardly only if the switching means are in the record mode.

6 Claims, 1 Drawing Figure

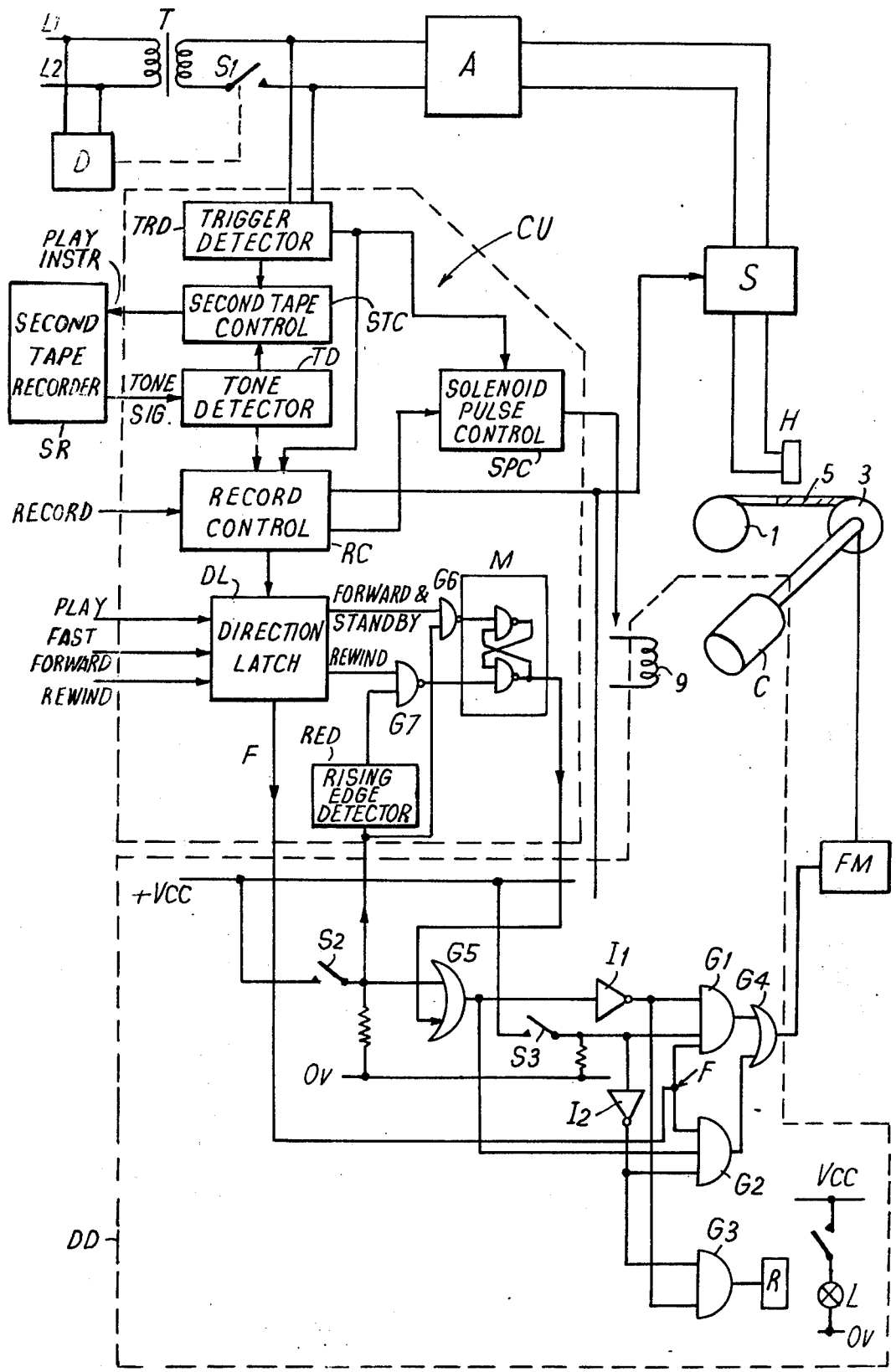

RECORDING AND REPRODUCING MEANS

This invention relates to recording and reproducing machines.

According to the present invention a recording and reproducing machine comprises recording and reproducing means, means for driving a recording medium forwardly along a predetermined path past the recording and reproducing means, means for switching electrical connections in the machine between a record mode, wherein incoming electrical signals applied to the recording and reproducing means are recorded on the medium, and a reproducing mode, wherein signals recorded on the medium are reproduced via the recording and reproducing means, detecting means which are adapted to assume a predetermined condition when the end of the last recorded signal on the recording medium is adjacent to the recording and reproducing means, and means coupling the detecting means and the switching means to the forward driving means so that when the detecting means are in the predetermined condition the driving means can be operated to drive the medium forwardly only if the switching means are in the record mode.

The invention will now be described, by way of example, with reference to the accompanying drawing, which is a schematic drawing of a recording and reproducing machine according to the invention.

The machine shown in the drawing is a telephone answering machine which is used to record messages transmitted from a remote subscriber and then to reproduce the messages when actuated by the owner of the machine. Reproduction of messages can be effected by operating controls on the front of the machine or by transmitted control signals via a telephone line.

Referring to the drawing, the present machine includes a supply spool 1, a take-up spool 3 and a motor FM for driving a magnetic tape 5 forwardly from the spool 1 to the spool 3. The tape 5 is used for recording incoming messages. In travelling between the spools 1 and 3 the tape 5 passes a sound recording and reproducing head H.

An erase head (not shown) is provided for erasing messages recorded on the tape 5 and a further motor (also not shown) is provided for driving the tape 5 rearwardly along the path from the take-up spool 3 to the supply spool 1.

Associated with the head H is an amplifier A and a switching circuit S for connecting the amplifier A to a secondary winding of a line transformer T. The condition of the switching circuit S is controlled by a control circuit CU, which also provides various other control signals for the machine, as hereinafter described. A primary winding of the transformer T is connected to a telephone line L1, L2.

The present machine also includes a second tape recorder SR having supply and take-up spools (not shown) for a second tape upon which an answering text is recorded. A drive motor and a second recording and reproducing head associated with the second tape are not shown in the drawings.

A ring detector circuit D is provided for detecting an incoming ringing signal on the line L1, L2. Upon detection of such a signal the circuit D provides a signal which operates a switch S1 connected to the secondary winding of the transformer T.

Associated with the control unit CU and the motor FM is a device DD for detecting the end of the message last recorded on the tape 5 and ensuring that a succeeding message is recorded on the next succeeding section of the tape.

Included in the control unit CU, referred to above, is a trigger detector TRD for detecting when the switch S1 has been closed to loop the telephone line. The detector TRD has two outputs, a first output connected to a tape control unit STC associated with the second recorder SR and a second output connected to a record control unit RC and to a solenoid pulse control unit SPC, hereinafter described.

The second recorder SR has a "play" input connected to the tape control unit STC and a "tone signal" output connected to a tone detector TD, also located in the control unit CU. A first output from the detector TD is connected to a resetting input to the tape control unit STC.

The record control unit RC is used in controlling operation of the first tape 5 when the machine is operated in the record mode. The unit has a first input which serves as a "record" input to the control unit CU and, in use, receives command signals from a manually operable button on the machine or from a remote caller via the line L1, L2. A second input to the record control unit RC is connected to a second output from the tone detector TD and a third input is connected to the second output from the trigger detector TRD, as mentioned above. A first output from the record control unit RC is connected to the solenoid pulse control unit SPC, a second output to a direction latch DL, and a third output to the switching circuit S and to the device DD for detecting the end of the last recorded message, as hereinafter described.

The direction latch DL is used for controlling operation of the tape 5 in "play", "fast forward" and "rewind" modes. To this end the latch has three inputs which serve as respective play, fast forward and rewind inputs to the control unit CU and each of which, in use, receives an appropriate command signal from a manually operable button or from a remote caller via the line L1, L2.

The direction latch DL has an output F which is used to actuate the motor FM for the tape 5, as hereinafter described. The latch also has forward and rewind outputs respectively connected to NAND gates G6 and G7, each having an output connected to a memory M. A second input to the gate G6 is directly connected to a further input to the control unit CU and a second input to the gate G7 is connected to the same input via a rising edge detector RED.

The detecting device DD includes a counter C which is releasably coupled to the take-up spool 3 and provides a count representing the number of revolutions of the spool since the counter was last in zero condition. A solenoid 9, operated by signals from the solenoid pulse control SPC in the control unit CU, is provided for use in decoupling the counter C from the spool 3 and returning the counter to the zero condition.

A counter switch S2, mechanically coupled to the counter C, is closed over a range of counts immediately before the zero condition and open when the count is outside that range. The switch S2 is electrically coupled to that input to the control unit CU which is connected via the rising edge detector RED and the gates G6 and G7 to the memory M.

The memory M is also provided with a signal from the direction latch DL each time there is a change in the direction of movement of the tape 5. In the result, the memory M provides a logical 0 output voltage when the switch S2 is open and the tape 5 is stationary with the end of the last recorded message adjacent to the head H. If the tape 5 is then rewound, the switch S2 is closed and the output from the memory M is switched to a logic 1.

If the control unit is then actuated to drive the tape 5 forwardly, the output of the memory M changes back to a logic 0 immediately if the switch S2 is still closed, or it switches back to a logic 0 as soon as the switch S2 closes, if the counter C had been wound back below the above-mentioned range.

As shown in the drawing, the switch S2 has one terminal connected to a positive supply line and a second terminal connected to a first input of an OR-gate G5. The output of the memory M is connected to a second input to gate G5 and the output of the gate is connected via an inverter I1 to a first input of an AND-gate G1. A 'record' switch S3, operated by an electrical signal from the record control unit RC of the control unit CU, is connected to a second input of the gate G1.

A third input to the gate G1 is connected to the output F from the direction latch DL in control unit CU. A logic 1 condition is applied to the third input of the gate G1 when the user of the machine presses a control button to initiate forward drive of the tape 5 or when a control signal to initiate forward drive is received from a remote caller. An output from the gate G1 is connected to a first input of an OR-gate G4, which has its output connected to the motor FM.

A second AND-gate has three inputs, one connected to the output F of the control unit CU, a second connected to the output of gate G5, and a third connected to the output of an inverter I2, whose input is connected to the record switch S3. An output of the gate G2 is connected to a second input of the gate G4.

A third AND-gate has one input connected to the output of the inverter I2 and a second input connected to the output of the inverter I1. An output of the gate G3 is connected to a relay R, which operates contacts for operating a standby lamp L and the ring detector circuit D.

The drawing shows the machine in a standby condition with the end of the last recorded message on the tape 5 adjacent to the head H. The counter C is then in an initial or zero count condition, the output of the memory M is in a logic 0 condition and the switches S1, S2 and S3 are open. Both inputs to the gate G5 are in a logic 0 condition and the output of the gate is also a logic 0. This means that there is a logic 1 at the output of the inverter I1 and at the first input to the gate G1. There is a logic 0 at the second input to the gate G1.

In operation, an incoming ringing signal on the line L1, L2 is detected by the detector circuit D which, after a delay, generates a signal for closing the switch S1. This causes the control unit CU to be connected to the secondary winding of the line transformer T and serves as a trigger to the trigger detector TRD in the unit, which proceeds to initate a predetermined sequence of switching operations.

First, the detector TRD actuates the tape control unit STC, which applies a "play" signal to the second tape recorder SR. The "play" signal causes the head associated with the above-mentioned second tape to be connected to the secondary winding of the transformer T, via the amplifier A. The "play" signal from the unit STC is also applied to the motor associated with the second tape and the tape is therefore driven from the supply to take-up spool and the answering text is transmitted to the line via transformer T.

At the end of the answering text a tone signal recorded on the second tape is applied from the "tone signal" output of the recorder SR to the tone detector TD in the unit CU. This causes the detector TD to re-set the unit STC and to actuate the record control unit RC. When actuated, the control unit RC generates a first signal which switches the switching circuit S to a record mode, wherein the input to the amplifier A is connected to the transformer T and the output from the amplifier is connected to the head H. The first signal also closes the switch S3, thereby applying a logic 1 to the second input of gate G1. A second signal is applied from the record control unit RC to the direction latch DL, which applies a signal corresponding to a logic 1 condition from the output F to the third input to the gate G1. All three inputs to the gate G1 are now in the logic 1 condition and the output goes to a logic 1 condition. This causes the output of gate G4 to go to logic 1 condition, switching on the motor FM, which drives the tape 5 forwardly from the spool 1 to the spool 3. The caller at the remote extension can now record his message on the tape 5. When the caller hangs-up the trigger detector TRD detects that the line L1, L2 is unlooped and actuates the record control unit RC. The second signal from the unit RC to the latch DL is removed and the output F goes to a logic 0 condition, causing the motor FM to cut off the drive to the tape 5. The first signal from the unit RC is removed so that the circuit S is switched from the record mode to a standby mode and the switch S3 is opened.

Whilst the tape 5 is being driven forwardly the counter C is rotated from the inital datum or zero condition. At the end of the recording period a signal is applied from the record control unit RC to the solenoid pulse control SPC, which applies current to the solenoid 9. This decouples the counter C from the spool 3 and causes the counter C to rotate to its zero condition. In this condition the switch S2 is still open.

This sequence of operations is repeated each time an incoming call is received and a message is recorded on the tape 5. At the end of each recording the end of the last recorded message on the tape 5 adjacent to the head H, the counter C is returned to a zero condition, the switch S2 remains open, and the output from the memory M remains at a logic 0.

Under these conditions, as described above, a voltage corresponding to a logic 0 condition is applied to the inverter I1 and a logic 1 condition is applied from the inverter to the first input of the gate G1. The output of the gate G1 can only assume a logic 1 condition if all three inputs are in a logic 1 condition. Accordingly, the motor FM cannot by driven forwardly be applying a signal corresponding to a logic 1 condition from the output F of the direction latch DL in the unit CU to the third input of the gate G1 unless the switch S3 has been closed by switching the machine to record mode.

During subsequent operation the owner of the machine may wish to rewind the tape prior to playing back recorded messages. This can be done by pressing the rewind button or by transmitting a command signal from a remote location. In each case an input signal is applied to the direction latch DL and a logic 1 signal is applied from the rewind output of the latch to the first input of the gate G7.

Immediately upon rewinding the counter C is wound backwards to a count below zero and the counter switch S2 is closed. The rising edge of the signal given when S2 closes is detected by the detector RED, which applies a logic 1 condition at the other input to gate G7. The output of the gate G7 then assumes a logic 0 condition, which causes the memory M to give a logic 1 at its output. There is then a logic 1 at each input to the gate G5, a logic 1 at the output of the gate G5, and a logic 0 at the output of the inverter I1 and at the first input to the gate G1. The switch S2 is re-opened if the tape is rewound by an amount sufficient to reduce the count on the counter C below the above-mentioned range immediately before zero count. This gives a logic 0 at the input to the gate G5 but the output of the gate remains at logic 1 and the output of the inverter I1 and the first input to gate G1 remains at logic 0.

If the operator now switches the machine to a record mode, by applying a signal to the record control RC, a signal from the third output of the record control RC causes the record switch S3 to close. A logic 1 voltage is then applied to the second input of the gate G1. However, since there is a logic 0 on the first input to the gate G1, the output of the gate is in a logic 0 condition and forward drive is prevented.

If the operator switches the machine to a playback or fast forward mode, by applying a signal to the appropriate input to the direction latch DL, a logical voltage is applied from the latch to the gate G6. The switch S3 remains open and a logic 1 condition is applied to the third input of the gate G2.

If the count on counter C is below the above-mentioned range, the switch S2 is open, there is a logic 0 voltage at the second input to the gate 6 and a logic 1 at the output of the gate 6. The output of the memory M could be a logic 0 or a logic 1 voltage. The switch S2 closes when the count reaches the bottom of the range, causing a logic 1 to be applied to the second input of the gate G6. The output of the gate G6 therefore switches to a logic 0, causing the output of the memory M to switch to a logic 0. Since the switch S2 is closed, the output of the gate G5 remains at a logic 1 voltage. If the count on the counter C is in the above-mentioned range, the switch S2 is already closed and maintains a logic 1 condition at the output of the gate G5 even though the appropriate input signal has been applied to the latch DL and output of the memory M falls immediately to a logic 0. The output of the gate G5 is connected to the second input of the gate G2, which is therefore at a logic 1 condition. Accordingly the tape can be driven forwardly by a logic 1 condition which is applied to input F of the gate G2 from the direction latch DL upon application of the fast forward or playback signal to the latch.

The fast forward or playback mode is terminated by the output of the gate G5 switching to a logic 0 voltage when the switch S2 opens as the head H reaches the end of the last recorded message and the counter returns to zero count. The control unit CU switches the machine from fast forward or playback to a standby mode. In this standby mode the first input of gate G3 is at a logic 1 voltage and the second input to the gate is also at a logic 1 condition since switch S3 is open. The output of gate G3 is then at a logic 1 voltage, the relay R is energised, the lamp L is switched on and the detector D is energised. The machine is then in a condition ready to answer an incoming call.

It will be appreciated that an erase head is provided in the above machine. The erase head is energised to erase previously recorded messages whenever the machine is operated in the recording mode. The erase head can also be energised during rewinding of a tape. When rewinding is terminated the counter is reset to a zero count condition and the memory M is set to a logic 0 by the unit CU.

It will be appreciated that a recording and reproducing machine according to the invention may be one which is adapted for recording and reproducing video or data signals.

What is claimed is:

1. In a recording and reproducing machine which includes recording and reproducing means, means for driving a recording medium forwardly along a predetermined path past the recording and reproducing means, means for switching electrical connections in the machine between a record mode, wherein incoming electrical signals applied to the recording and reproducing means may be recorded on the medium, and a reproducing mode, wherein signals recorded on the medium are reproduced via the recording and reproducing means, the improvement comprising detecting means responsive to the position of said recording medium for assuming a predetermined condition when the end of the most recently recorded signal on the recording medium is adjacent to the recording and reproducing means, means for developing a signal representative of the condition of said switching means, and means responsive to the condition of the detecting means and to the signal representative of the condition of the switching means for controlling the forward driving means so that when the detecting means are in the predetermined condition the driving means can be operated to drive the medium forwardly only if the switching means are in the record mode.

2. A recording and reproducing machine as claimed in claim 1, wherein the detecting means are adapted to assume a second predetermined condition when the medium has been moved to a position on the predetermined path rearwardly of the recording and reproducing means, and the coupling means are then adapted to prevent operation of the driving means to drive the medium forwardly if the switching means are in the record mode.

3. A recording and reproducing machine as claimed in claim 1 or 2, wherein the detecting means are adapted, when the forward driving means are driving the recording medium forwardly and a section of the medium bearing recorded signals is adjacent the recording and reproducing means, to actuate the driving means when the end of the last recorded signal reaches the recording and reproducing means, whereby operation of the forward driving means is terminated.

4. A recording and reproducing machine as claimed in claim 3, wherein the detecting means actuate a tone generator which generates a predetermined signal when the end of the last recorded signal reaches the recording and reproducing means.

5. A recording and reproducing machine as claimed in claim 1, wherein the detecting means include a rotatable element, means for rotating the element to a predetermined angular position when the recording of an incoming signal has been completed, operation of the forward driving means has been terminated, and the switching means have been switched from the record mode, and an electrical switch which is associated with the rotatable element and is caused to assume a predetermined condition when the element is in the predetermined angular position.

6. A recording and reproducing means as claimed in claim 5, wherein the rotatable element is releasably coupled to the medium, means are provided for decoupling the element from the medium and rotating the element to the predetermined angular position when the recording of an incoming signal has been completed, operation of the forward driving means has been terminated, and the switching means have been switched from the record mode, and for coupling the element to the medium when the element has reached the predetermined angular position.

* * * * *

UNITED STATES PATENT AND TRADEMARK OFFICE
CERTIFICATE OF CORRECTION

PATENT NO. : 4,134,141
DATED : January 9, 1979
INVENTOR(S) : Robinson et al

It is certified that error appears in the above-identified patent and that said Letters Patent are hereby corrected as shown below:

In the title page, between lines "[22]" and "[30]" should be inserted the following data:

--Related U.S. Application Data

[63] Continuation-in-part of Ser. No. 598,937, July 25, 1975, abandoned.--

The serial number appearing in the Foreign Application Priority Data should read:

--33228/74--

Signed and Sealed this

Twenty-fourth Day of July 1979

[SEAL]

Attest:

LUTRELLE F. PARKER
Attesting Officer
Acting Commissioner of Patents and Trademarks